(12) United States Patent
Jacques et al.

(10) Patent No.: US 8,333,173 B2
(45) Date of Patent: Dec. 18, 2012

(54) CAMSHAFT PROFILE FOR REDUCING CYLINDER PRESSURES DURING ENGINE CRANKING

(75) Inventors: Robert Lionel Jacques, Troy, MI (US); Gerald J. Hysko, Jr., Grand Blanc, MI (US)

(73) Assignee: GM Global Technology Operations LLC

( * ) Notice: Subject to any disclaimer, the term of this patent is extended or adjusted under 35 U.S.C. 154(b) by 468 days.

(21) Appl. No.: 12/651,636

(22) Filed: Jan. 4, 2010

(65) Prior Publication Data

US 2011/0162600 A1 Jul. 7, 2011

(51) Int. Cl.
*F01L 1/04* (2006.01)

(52) U.S. Cl. .................... 123/90.6; 123/90.16

(58) Field of Classification Search .............. 123/90.16, 123/90.17, 90.6
See application file for complete search history.

(56) References Cited

U.S. PATENT DOCUMENTS

| 2,628,605 A | * | 2/1953 | Jones et al. ............. 123/90.6 |
| 4,852,527 A | | 8/1989 | Beardmore et al. |

* cited by examiner

*Primary Examiner* — Zelalem Eshete
(74) *Attorney, Agent, or Firm* — Harness, Dickey & Pierce, P.L.C.

(57) ABSTRACT

A camshaft assembly may include a shaft and a lobe member fixed for rotation with the shaft. The lobe member may include a lobe extending radially outward from a base circle. The lobe may include a valve closing profile defined between a peak of the lobe and an ending point of the lobe on the base circle. The valve closing profile may define a closing flank and a closing ramp extending from an end of the closing flank to the ending point. The closing ramp may have a radial extent from the base circle at the end of the closing flank that is less than ten percent of the radial extent of the peak from the base circle and may have a first angular extent of at least ten degrees. A second angular extent defined between the peak and the ending point may be at least eighty degrees.

19 Claims, 4 Drawing Sheets

CAMSHAFT PROFILE FOR REDUCING CYLINDER PRESSURES DURING ENGINE CRANKING

FIELD

The present disclosure relates to engine camshafts and, more particularly, to camshaft profiles for intake lobes of the camshafts.

BACKGROUND

This section provides background information related to the present disclosure which is not necessarily prior art.

Hybrid vehicles may be propelled by a powertrain including an internal combustion engine and one or more electric motors. During operation, drive torque may be supplied by the engine and/or the electric motors. Some hybrid engine systems stop the engine when the vehicle is brought to a stop and restart the engine when the vehicle begins to move again. One or more of the electric motors may supply the torque used to crank and thereby restart the engine.

The torque required to start the engine is related to engine cranking compression. Delaying the closing of engine intake valves may reduce cranking compression during the compression stroke. However, delaying the closing of the inlet valves may reduce engine torque over the operating speed range of the engine, requiring larger engine displacement to compensate for the reduced engine torque output.

SUMMARY

A camshaft assembly may include a shaft and a lobe member fixed for rotation with the shaft. The lobe member may include a lobe extending radially outward from a base circle. The lobe may include a valve closing profile defined between a peak of the lobe and an ending point of the lobe on the base circle. The valve closing profile may define a closing flank and a closing ramp extending from an end of the closing flank to the ending point. The closing ramp may have a radial extent from the base circle at the end of the closing flank that is less than ten percent of the radial extent of the peak from the base circle and may have a first angular extent of at least ten degrees. A second angular extent defined between the peak and the ending point may be at least eighty degrees.

A powertrain assembly may include an engine assembly that includes an engine structure, a crankshaft, a piston, an intake valve, a valve lift mechanism, and a camshaft assembly. The engine structure may define a cylinder bore and an intake port in communication with the cylinder bore. The crankshaft may be rotationally supported on the engine structure. The piston may be located within the cylinder bore and may be coupled to the crankshaft for reciprocal displacement within the cylinder bore. The intake valve may be supported by the engine structure and may selectively open and close the intake port. The valve lift mechanism may be supported by the engine structure and may be engaged with the intake valve. The camshaft assembly may be rotationally supported on the engine structure and may be rotationally driven by the crankshaft. The camshaft assembly may include a lobe member engaged with the valve lift mechanism for opening and closing the intake valve and including a base circle and a lobe extending radially outward from the base circle.

The lobe may be engaged with the valve lift mechanism for at least eighty degrees of crankshaft rotation during a compression stroke of the piston immediately subsequent to an intake stroke of the piston. The lobe may include a valve closing portion defined between a peak of the lobe and an ending point of the lobe on the base circle. The peak may be engaged with the valve lift mechanism during the intake stroke and the valve closing portion may be engaged with the valve lift mechanism for at least one hundred and sixty degrees of crankshaft rotation between a beginning of the intake stroke and an end of the compression stroke. The valve closing portion may define a closing flank and a closing ramp extending from an end of the closing flank to the ending point.

The closing ramp may have a radial extent from the base circle at the end of the closing flank that is less than ten percent of a radial extent of the peak from the base circle. The closing ramp may be engaged with the valve lift mechanism for at least twenty degrees of crankshaft rotation during the compression stroke. The radial extent of the closing ramp may be constantly decreasing along a first angular extent defined between the end of the closing flank and the ending point. The closing ramp may provide a displacement of the intake valve of at least 0.1 millimeters (mm).

A method may include opening an intake valve in communication with an engine cylinder during an intake stroke of a piston located in the cylinder. The opening may include displacing the intake valve to a maximum displacement position via a camshaft lobe member engaged with the intake valve. The method may further include maintaining the intake valve open via the camshaft lobe member for at least one hundred and sixty degrees of rotation of a crankshaft engaged with the piston after the displacing the intake valve to the maximum displacement position. The method may further include closing the intake valve via the camshaft lobe member at least eighty degrees of rotation of the crankshaft after beginning a compression stroke of the piston immediately subsequent to the intake stroke.

The maintaining may include displacing the intake valve from a first position where the intake valve is open at least 0.1 mm to a closed position by engaging a closing ramp of a valve closing portion of the camshaft lobe member. The valve closing portion may be defined between a peak of a lobe extending radially outward from a base circle of the camshaft lobe member and an ending point of the lobe on the base circle. The closing ramp may extend from an end of a closing flank of the valve closing portion to the ending point and may have a constantly decreasing radial extent from the base circle between the end of the closing flank and the ending point. The closing ramp may be engaged with the intake valve for at least twenty degrees of crankshaft rotation. The displacing the intake valve from the first position to the closed position may include displacing the intake valve at intake valve velocities no greater than 0.030 mm/degree of rotation of the camshaft lobe member and accelerations no greater than −0.005 mm/degree$^2$.

Further areas of applicability will become apparent from the description provided herein. The description and specific examples in this summary are intended for purposes of illustration only and are not intended to limit the scope of the present disclosure.

BRIEF DESCRIPTION OF THE DRAWINGS

The drawings described herein are for illustrative purposes only and are not intended to limit the scope of the present disclosure in any way.

Corresponding reference numerals indicate corresponding parts throughout the several views of the drawings.

DETAILED DESCRIPTION

Examples of the present disclosure will now be described more fully with reference to the accompanying drawings. The following description is merely exemplary in nature and is not intended to limit the present disclosure, application, or uses.

Figure 1:
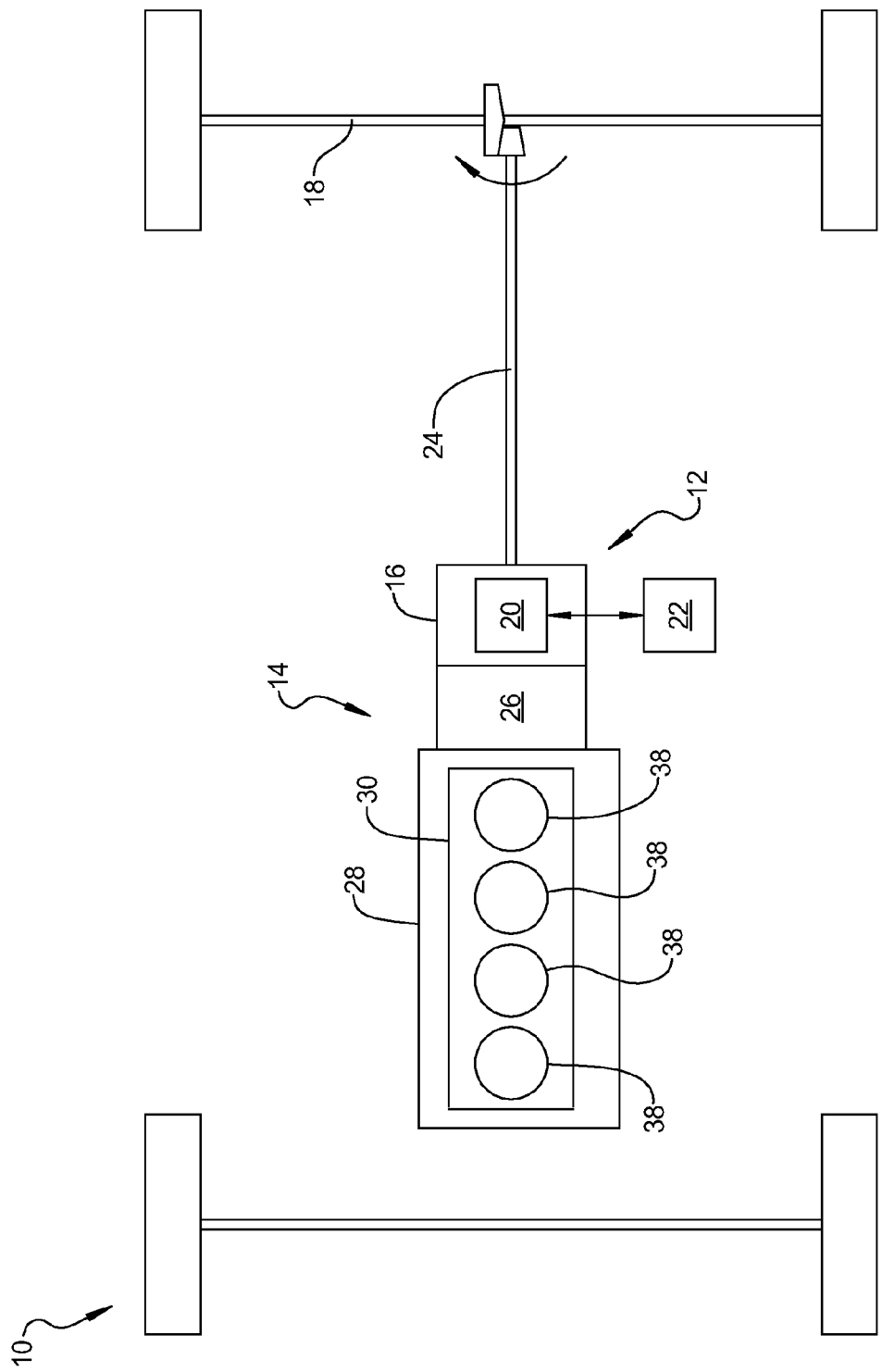
FIG. 1 is a schematic illustration of an exemplary hybrid vehicle assembly according to the present disclosure.

With reference to FIG. 1, a hybrid vehicle assembly 10 is schematically illustrated. The hybrid vehicle assembly 10 may include a hybrid power assembly 12, an engine assembly 14, a transmission 16, and a drive axle 18. The hybrid power assembly 12 and the engine assembly 14 may form a powertrain assembly. The hybrid power assembly 12 may include an electric motor 20 and a rechargeable battery 22. The electric motor 20 and the battery 22 may form a drive mechanism for the hybrid power assembly 12.

The electric motor 20 may be in electrical communication with the battery 22 to convert power from the battery 22 to mechanical power. The electric motor 20 may power rotation of the engine assembly 14 and may operate as a starter to crank and thereby start the engine assembly 14. The electric motor 20 may additionally be powered by the engine assembly 14 and operated as a generator to provide power to charge the battery 22. The hybrid power assembly 12 may be incorporated into and engaged with the transmission 16. The electric motor 20 may be coupled to an output shaft 24 to power rotation of the drive axle 18 via the transmission 16.

The engine assembly 14 may be coupled to the transmission 16 via a coupling device 26 and may drive the transmission 16. The coupling device 26 may include a friction clutch or a torque converter. The transmission 16 may use the power provided by the engine assembly 14 and/or the electric motor 20 to drive the output shaft 24 and power rotation of the drive axle 18.

The engine assembly 14 may be of the four-stroke reciprocating type having a combustion cycle that includes an intake stroke, a compression stroke, a combustion (or power) stroke, and an exhaust stroke. With additional reference to FIG. 2, the engine assembly 14 includes an engine structure that may include a block assembly 28 and a cylinder head assembly 30 mounted on the block assembly 28. The block assembly 28 may include an engine block 32, pistons 34, and a crankshaft 36.

The engine block 32 may define cylinder bores 38. The pistons 34 may be disposed within the cylinder bores 38 and may reciprocate therein. The cylinder bores 38 may cooperate with the cylinder head assembly 30 and corresponding pistons 34 to define corresponding combustion chambers 40 (only one is shown). It is understood that the present disclosure applies to any number of piston-cylinder bore arrangements and a variety of engine configurations including, but not limited to, V-engines, inline engines, and horizontally opposed engines, as well as both overhead camshaft and cam-in-block configurations.

Each of the pistons 34 may reciprocate between a top-dead-center (TDC) position and a bottom-dead-center (BDC) position during operation of the engine assembly 14. At the TDC position, the corresponding combustion chamber 40 may define a minimum volume. At the BDC position, the corresponding combustion chamber 40 may define a maximum volume. The crankshaft 36 may be rotationally supported on the engine block 32 and coupled to the pistons 34. The crankshaft 36 may be rotationally driven by the pistons 34 during operation of the engine assembly 14.

Figure 2:
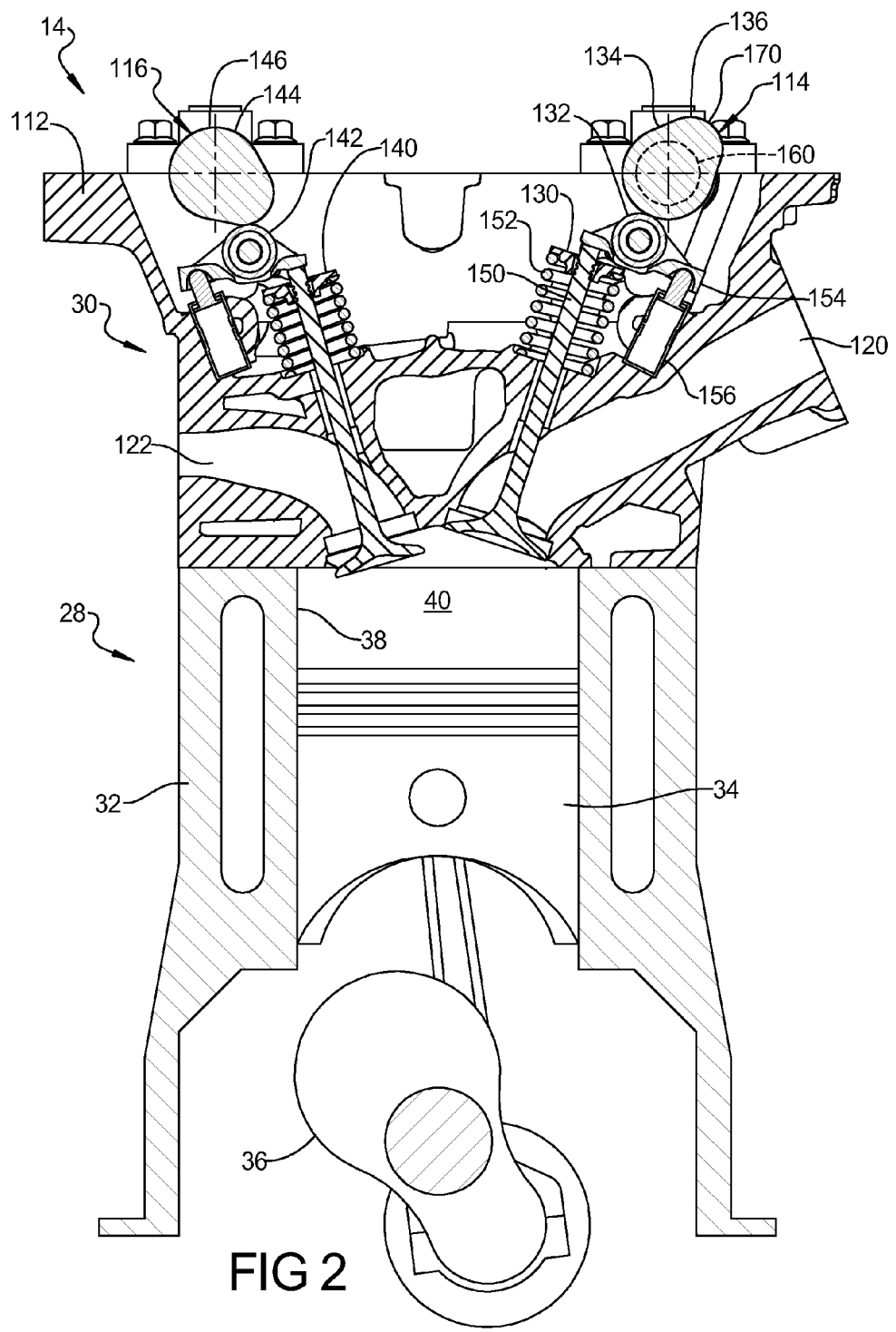
FIG. 2 is a section view of an exemplary engine assembly according to the present disclosure.

With continued reference to FIG. 2, the cylinder head assembly 30 may include a cylinder head 112, an intake valvetrain assembly 114, and an exhaust valvetrain assembly 116. The cylinder head 112 may abut the engine block 32 and may define intake ports 120 and exhaust ports 122. The intake and exhaust ports 120, 122 may be in communication with the combustion chambers 40.

The intake valvetrain assembly 114 may be supported on the cylinder head 112. The intake valvetrain assembly 114 may include intake valve assemblies 130 operated via intake valve lift mechanisms 132 by an intake camshaft assembly 134 including lobe members 136. The intake valvetrain assembly 114 may further include a first cam phaser (not shown). The exhaust valvetrain assembly 116 may include exhaust valve assemblies 140 operated via exhaust valve lift mechanisms 142 by an exhaust camshaft assembly 144 including lobe members 146. The exhaust valvetrain assembly 116 may further include a second cam phaser (not shown). It is understood that the present disclosure applies to a variety of camshaft arrangements including, but not limited to, fixed lobe camshafts and concentric camshafts.

The exhaust valve assemblies 140 and the exhaust valve lift mechanisms 142 may be generally similar to the intake valve assemblies 130 and the intake valve lift mechanisms 132, respectively, and therefore will not be described in further detail. The present disclosure is not limited to lobe members 146 providing a particular displacement (i.e., lift) profile for the exhaust valves of the exhaust valve assemblies 140.

The intake valve assemblies 130 may include intake valves 150 and spring elements 152. The intake valves 150 may be disposed in the intake ports 120 and may be biased in a closed position by the spring elements 152. The intake valve lift mechanisms 132 may engage the intake valves 150 and the lobe members 136 of the intake camshaft assembly 134. The intake valve lift mechanisms 132 may selectively displace the intake valves 150 between the closed position and an open position in response to rotation of the lobe members 136.

The intake valve lift mechanisms 132 may include rocker arms 154 and lash adjusters 156. The rocker arms 154 may engage corresponding intake valves 150 on one end and may pivot about corresponding lash adjusters 156 on an opposite end. The rocker arms 154 may selectively translate a first linear displacement of the rocker arms 154 by the lobe members 136 to a second linear displacement of the intake valves 150 at ratios greater than one. The lash adjusters 156 may be hydraulically-operated and may provide hydraulic lash adjustment that selectively maintains engagement between the intake valve assemblies 130, the intake valve lift mechanisms 132, and the intake camshaft assembly 134.

While FIG. 2 illustrates the intake valve lift mechanisms 132 are of the rocker-type, the present disclosure is not limited solely to rocker-type configurations and applies equally to other conventional valve lift mechanisms. By way of non-limiting example, the present disclosure applies to valve lift mechanisms that include lifters disposed between and directly engaged with the intake valves and the lobe members of the camshaft.

The intake camshaft assembly 134 may include a shaft 160 rotationally supported on the cylinder head 112 above the intake valves 150 and the rocker arms 154. The intake camshaft assembly 134 may be rotationally driven by the crankshaft 36. By way of non-limiting example, the intake camshaft assembly 134 may be rotationally driven by the crankshaft 36 via a chain or a belt coupled to the shaft 160. In a non-limiting example, the intake camshaft assembly 134 is coupled for rotation at a first rotational speed that is one-half a second rotational speed of the crankshaft 36.

The lobe members 136 may be fixed for rotation with the shaft 160 and may engage corresponding intake valves 150 via corresponding intake valve lift mechanisms 132. Each of the lobe members 136 may define a lobe profile 170 engaged with the corresponding intake valve lift mechanism 132 and controlling the opening and closing of the corresponding intake valve 150. As discussed below, the lobe profile 170 may provide a valve displacement profile for the intake valves 150 that lowers cranking compression.

By way of non-limiting example, the valve displacement profile may lower cranking compression by reducing a trapping efficiency of the combustion chambers 40 at engine cranking speeds. Generally, trapping efficiency refers to the ratio of the mass of air retained in a cylinder (first mass) to the mass of air supplied to the cylinder (second mass). Additionally, the lobe profile 170 may provide a valve displacement profile that reduces a corresponding torque loss over the operating speed range of the engine assembly 14 when compared with conventional late intake valve closing designs.

The valve displacement profile reduces the torque loss through increased trapping efficiency at engine speeds above the cranking speeds. The trapping efficiency is increased by the reduction in the time available for cylinder leakage during valve closing at higher engine speeds and the pumping restriction created by a small curtain area during valve closing. Generally, the curtain area at a particular camshaft angle is equal to a product of a circumference and the valve displacement at the camshaft angle. As a result, engine displacement may be reduced for a given engine torque output. Engine vibration during cranking may also be reduced.

Figure 3:
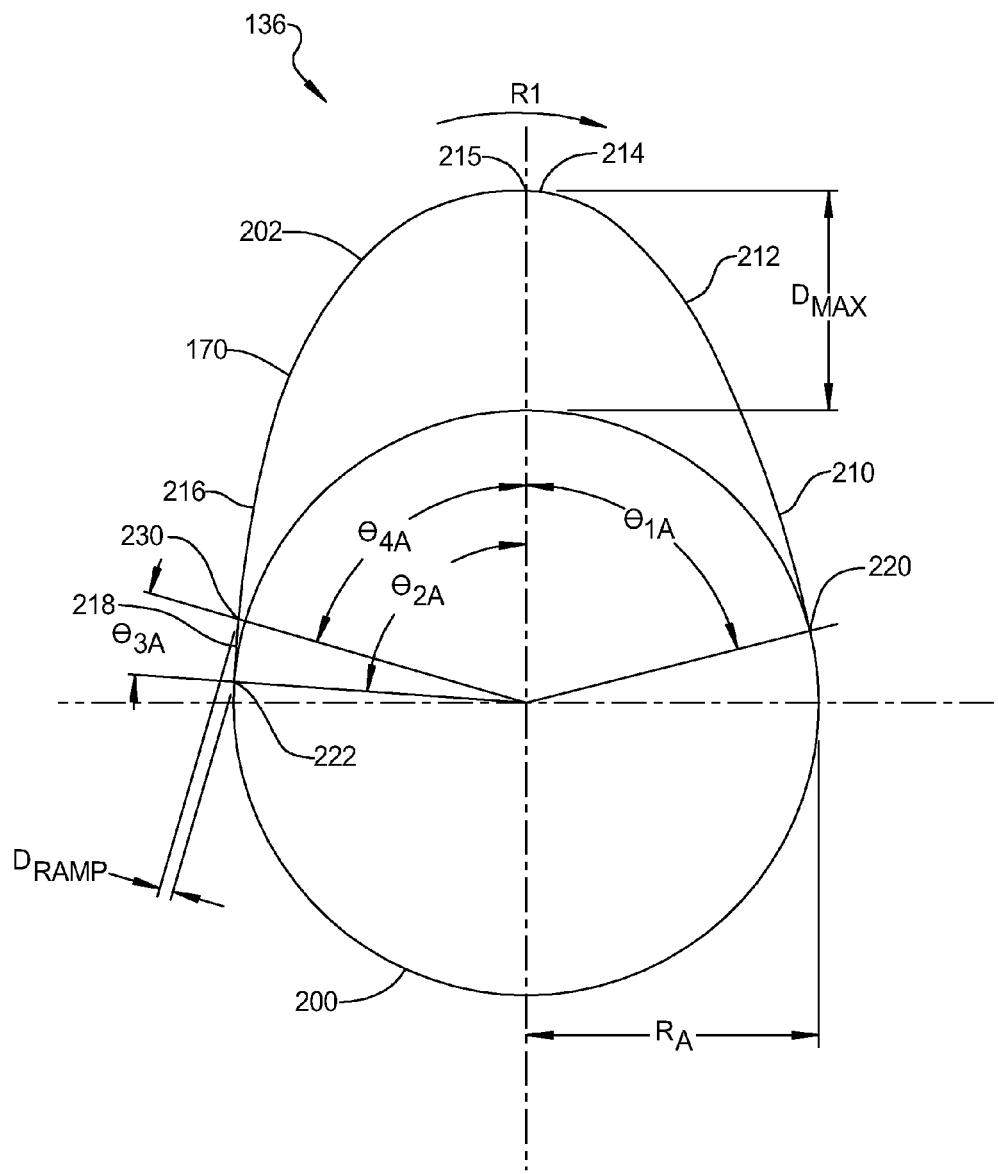
FIG. 3 is a schematic illustration of an exemplary intake lobe profile according to the present disclosure.

Referring now to FIG. 3, a schematic illustration of the lobe profile of the lobe members 136 is shown. For reference, the lobe members 136 may rotate in a direction indicated by arrow (R1) during engine operation. The lobe profile 170 of the lobe members 136 may include a base circle 200 and a lobe 202 extending radially outward from the base circle 200. The base circle 200 may have a radius ($R_A$). The radius ($R_A$) may be determined based on whether the particular valve lift mechanism provides for hydraulic lash adjustment or mechanical lash adjustment.

The lobe 202 of the lobe profile 170 may include an opening ramp 210, an opening flank 212, a nose 214 having a peak 215, a closing flank 216, and a closing ramp 218. The lobe 202 may extend from a valve opening point 220 on the base circle 200 to a valve closing point 222 on the base circle 200. A first angular extent ($\theta_{1A}$) between the valve opening point 220 and the peak 215 may define an opening duration of the valve opening event. A second angular extent ($\theta_{2A}$) between the peak 215 and the valve closing point 222 may define a closing duration of the valve opening event. Thus, the valve opening point 220 and the valve closing point 222 may have an overall angular extent ($\theta_{1A}+\theta_{2A}$) corresponding to an overall duration of the valve opening event.

The second angular extent ($\theta_{2A}$) may be greater than the first angular extent ($\theta_{1A}$). By way of non-limiting example, the second angular extent ($\theta_{2A}$) may be greater than or equal to eighty degrees, and more specifically, between eighty degrees and one hundred degrees.

The opening ramp 210, the opening flank 212, and the nose 214 may define a valve opening profile for the valve opening event. The opening ramp 210 may begin at the valve opening point 220. The opening flank 212 may extend from an end of the opening ramp 210 to a starting point of the nose 214. While the opening flank 212 is described as extending to the starting point of the nose 214, the opening flank 212 may extend to the peak 215. In this case, the opening flank 212 may provide a valve displacement profile for transitioning from the opening ramp 210 to the peak 215. The present disclosure is not limited to a particular opening duration (i.e., $\theta_{1A}$) or valve opening profile. Therefore, the opening ramp 210, the opening flank 212, and the nose 214 will not be discussed in detail.

The nose 214, the closing flank 216, and the closing ramp 218 may define a valve closing profile for the valve opening event. The nose 214 may end at a starting point (not shown) of the closing flank 216. It is understood that the present disclosure is not limited to a particular design of the nose 214. Generally, the nose 214 may provide a valve displacement profile for transitioning from the opening flank 212, through the peak 215, to the closing flank 216. The nose 214 may provide a valve displacement profile providing decreasing velocities (i.e., negatively sloped velocity profile) and low negative accelerations of the intake valves 150. The intake valve velocities and accelerations may vary and may be a function of valvetrain geometry.

The peak 215 may have a radial extent ($D_{Max}$) from the base circle 200 that provides a maximum displacement ($L_{max}$) of the corresponding intake valve 150. However, it is understood that the present disclosure is not limited to a particular maximum displacement ($L_{max}$). By way of non-limiting example, the maximum displacement ($L_{max}$) may be around 10.0 mm.

The closing flank 216 may end at a starting point 230 of the closing ramp 218. The present disclosure is not limited to a particular profile for the closing flank 216. Generally, the closing flank 216 may provide a valve displacement profile for transitioning between the nose 214 and the closing ramp 218. The closing flank 216 may provide a valve displacement profile providing increasing velocities (i.e., a positively sloped velocity profile) and low positive accelerations of the intake valves 150. By way of non-limiting example, the closing flank may provide intake valve velocities between 0.20 mm/degree and 0.35 mm/degree of camshaft rotation and intake valve accelerations less than 0.015 mm/degree$^2$. While the closing flank 216 is described as having a starting point at an end of the nose 214, the closing flank 216 may begin at the peak 215. In this case, the closing flank 216 may provide a valve displacement profile for transitioning from the peak 215 to the closing ramp 218.

The closing ramp 218 may extend from the closing flank 216 to the valve closing point 222. The closing ramp 218 may provide a valve displacement profile providing a low and generally constant velocity of the intake valve 150 over the duration of the closing ramp 218. By way of non-limiting example, the closing ramp 218 may provide intake valve velocities less than 0.030 mm/degree of camshaft rotation, and more specifically around 0.014 mm/degree. By way of another non-limiting example, the closing ramp 218 may provide intake valve accelerations less than −0.005 mm/degree$^2$, and more specifically between zero mm/degree$^2$ and −0.005 mm/degree$^2$.

The closing ramp 218 may have a third angular extent ($\theta_{3A}$) greater than or equal to ten degrees, and more specifically between ten and twenty degrees. At the starting point 230, the closing ramp 218 may have a radial extent ($D_{Ramp}$) from the base circle 200 that provides a displacement ($L_{Ramp}$) of the intake valves 150. By way of non-limiting example, the displacement ($L_{Ramp}$) may be greater than or equal to 0.1 mm, and more specifically between 0.1 mm and 1.0 mm. In the present non-limiting example, the displacement ($L_{Ramp}$) is illustrated as 0.5 mm (FIG. 4).

From the starting point 230 at the end of the closing flank 216 to the valve closing point 222, the closing ramp 218 may have a radial extent that, in general, is constantly decreasing. The radial extent of the closing ramp 218 at the starting point 230 ($D_{Ramp}$) may be less than ten percent of the radial extent of the nose 214 at the peak 215 ($D_{Max}$). In the present non-limiting example, the radial extent of the closing ramp 218 at the starting point 230 is approximately five percent (0.5 mm/10.0 mm=0.05) of the radial extent of the nose 214 at the peak 215 ($D_{Max}$).

The starting point 230 may be a function of the second angular extent ($\theta_{2A}$) and the third angular extent ($\theta_{3A}$). By way of non-limiting example, the starting point 230 may be rotationally offset from the peak 215 by a fourth angular extent ($\theta_{4A}$) of sixty to eighty-five degrees.

Figure 4:
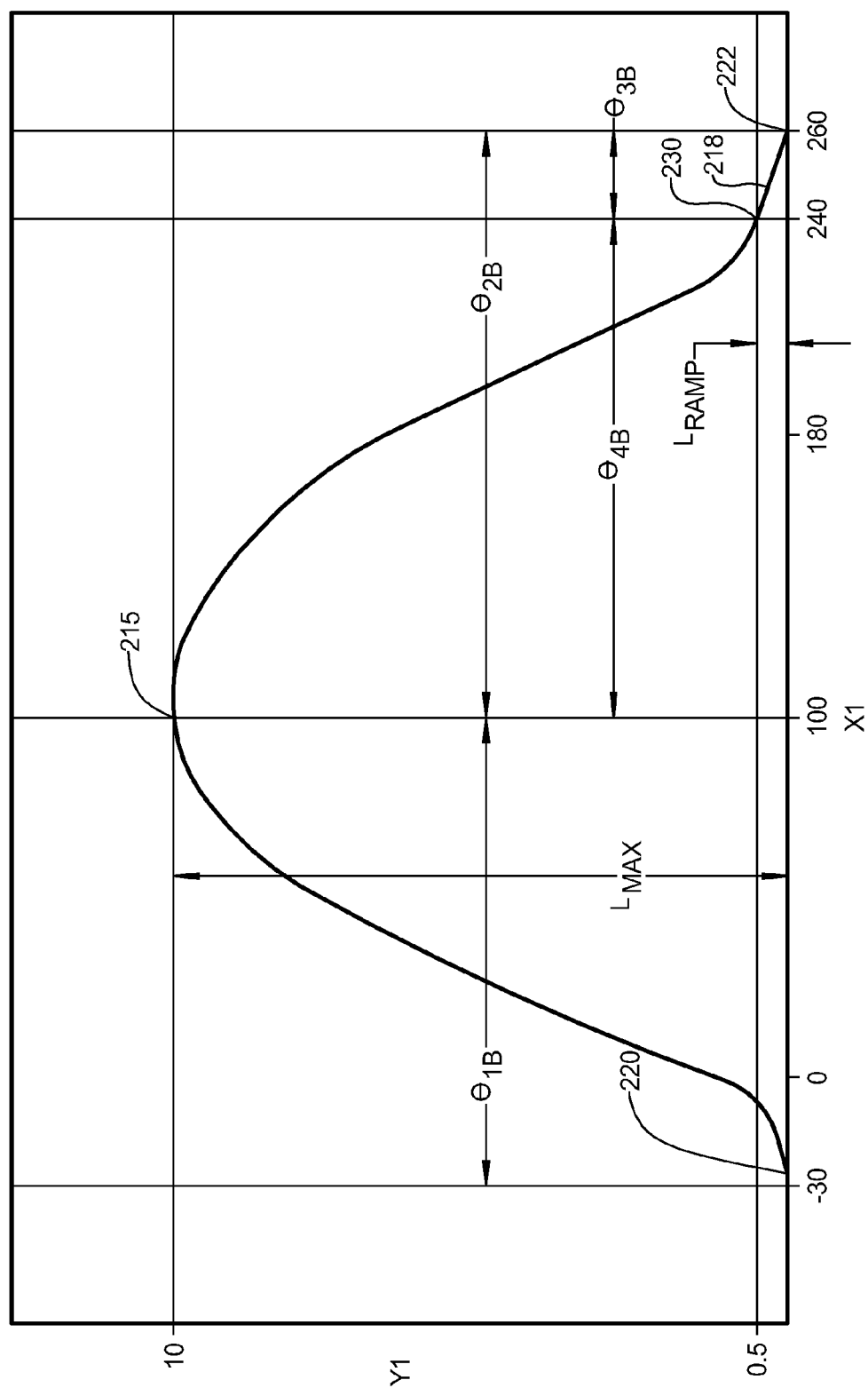
FIG. 4 is a graph illustrating an exemplary valve displacement profile according to the present disclosure in a plot of valve displacement versus crankshaft rotational angle.

FIG. 4 illustrates the displacement of the intake valve 150 provided by the lobe 202. The graph of FIG. 4 generally illustrates valve displacement in millimeters along the Y-axis (Y1) and rotational displacement of the crankshaft 36 along the X-axis (X1). In FIG. 4, zero degrees generally corresponds to a TDC position of the crankshaft 36 at an end of an exhaust stroke and a beginning of an intake stroke. Additionally, one hundred and eighty degrees generally corresponds to a BDC position of the crankshaft 36 at an end of the intake stroke and a beginning of a compression stroke.

Nominally, the point of maximum displacement provided by the peak 215 during the intake stroke may be located between one hundred degrees and one hundred and forty-five degrees after TDC. Accordingly, in the present non-limiting example illustrated in the graph, the point of maximum displacement is shown generally located at one hundred degrees after TDC. For reference, portions of the valve displacement profile corresponding to features of the lobe 202 are identified. In particular, the portions of the valve displacement profile corresponding to the valve opening and closing points 220, 222, the peak 215, and the starting point 230 of the closing ramp 218 are identified.

As discussed above, the exemplary rotational speed of the intake camshaft assembly 134 is one-half the second rotational speed of the crankshaft 36. Therefore, it should be understood that first, second, third, and fourth angular extents ($\theta_{1B}$, $\theta_{2B}$, $\theta_{3B}$, $\theta_{4B}$) of the valve displacement profile are twice the duration of the first, second, third, and fourth angular extents ($\theta_{1A}$, $\theta_{2A}$, $\theta_{3A}$, $\theta_{4A}$) of the lobe profile 170. Similarly, ranges for the second, third, and fourth angular extents ($\theta_{2B}$, $\theta_{3B}$, $\theta_{4B}$) are twice the ranges for the second, third, and fourth angular extents ($\theta_{2A}$, $\theta_{3A}$, $\theta_{4A}$) discussed above. In particular, the second angular extent ($\theta_{2B}$) may be between one hundred and sixty degrees and two hundred degrees of crankshaft rotation. Similarly, the third angular extent ($\theta_{3B}$) may be between twenty and forty degrees of crankshaft rotation and the fourth angular extent ($\theta_{4B}$) may be between one hundred and twenty and one hundred and seventy degrees of crankshaft rotation.

In the non-limiting example illustrated in FIG. 4, the valve closing point 222 is shown generally located at a crankshaft rotational position of two hundred and sixty degrees after TDC, or eighty degrees after BDC. While shown at two hundred and sixty degrees after TDC, the valve closing point 222 may be located between two hundred and sixty degrees and three hundred degrees after TDC, or between eighty degrees and one hundred and twenty degrees after BDC.

The starting point 230 of the closing ramp 218 is shown generally located at a crankshaft rotational position of two hundred and forty degrees after TDC, or sixty degrees after BDC. While shown at two hundred and forty degrees after TDC, the starting point 230 may vary depending on the location of the valve closing point 222 and the third angular extent ($\theta_{3B}$). With the foregoing in mind, the starting point 230 may be located between two hundred and twenty degrees and two hundred and seventy degrees after TDC, or between forty and ninety degrees after BDC.

As discussed above, the displacement of the intake valves 150 at the starting point 230 may be between 0.1 mm and 1.0 mm. FIG. 4 illustrates, by way of non-limiting example, a displacement of 0.5 mm.

What is claimed is:

1. A camshaft assembly comprising:
   a shaft; and
   a lobe member fixed for rotation with the shaft and including a base circle and a lobe extending radially outward from the base circle, the lobe including a valve closing profile defined between a peak of the lobe and an ending point of the lobe on the base circle and a valve opening portion defined between a starting point on the lobe and the peak, the valve closing profile defining a closing flank and a closing ramp extending from an end of the closing flank to the ending point, the closing ramp having a radial extent from the base circle at the end of the closing flank that is less than 10 percent of the radial extent of the peak from the base circle and having a first angular extent of at least 10 degrees, a second angular extent of the lobe defined between the peak and the ending point being greater than a third angular extent of the lobe defined between the starting point and the peak.

2. The camshaft assembly of claim 1 wherein the first angular extent of the lobe is defined between the end of the closing flank and the ending point and the radial extent of the closing ramp is constantly decreasing along the first angular extent.

3. The camshaft assembly of claim 1 wherein the second angular extent defined between the peak and the ending point is at least 80 degrees.

4. The camshaft assembly of claim 3 wherein the third angular extent of the lobe defined between the peak and the end of the closing flank is between 60 degrees and 85 degrees.

5. The camshaft assembly of claim 1 wherein the lobe member is an intake lobe member.

6. The camshaft assembly of claim 1 wherein the valve opening portion defines an opening ramp beginning at the starting point and an opening flank extending from an end of the opening ramp, the second angular extent defined on the opening ramp between the starting point and the end of the opening ramp and being less than the first angular extent.

7. A powertrain assembly comprising:
   an engine assembly including an engine structure defining a cylinder bore and an intake port in communication with the cylinder bore;
   a crankshaft rotationally supported on the engine structure;
   a piston located within the cylinder bore and coupled to the crankshaft for reciprocal displacement within the cylinder bore;
   an intake valve supported by the engine structure and selectively opening and closing the intake port;
   a valve lift mechanism supported by the engine structure and engaged with the intake valve;
   a camshaft assembly rotationally supported on the engine structure and rotationally driven by the crankshaft, the camshaft assembly including a lobe member engaged with the valve lift mechanism for opening and closing the intake valve, the lobe member including a base circle and a lobe extending radially outward from the base circle, the lobe engaged with the valve lift mechanism for at least 80 degrees of crankshaft rotation during a compression stroke of the piston immediately subsequent to an intake stroke of the piston; and a hybrid power assembly engaged with and adapted to power rotation of the engine assembly.

8. The powertrain assembly of claim 7 wherein the lobe includes a valve closing portion defined between a peak of the lobe and an ending point of the lobe on the base circle, the peak engaged with the valve lift mechanism during the intake stroke and the valve closing portion engaged with the valve lift mechanism for at least 160 degrees of crankshaft rotation between a beginning of the intake stroke and an end of the compression stroke.

9. The powertrain assembly of claim 7 wherein the lobe includes a valve closing portion defined between a peak of the lobe and an ending point of the lobe on the base circle, the valve closing portion defining a closing flank and a closing ramp extending from an end of the closing flank to the ending point, the closing ramp having a radial extent from the base circle at the end of the closing flank that is less than 10 percent of a radial extent of the peak from the base circle, the closing ramp engaged with the valve lift mechanism for at least 20 degrees of crankshaft rotation during the compression stroke.

10. The powertrain assembly of claim 9 wherein the radial extent of the closing ramp is constantly decreasing along a first angular extent defined between the end of the closing flank and the ending point.

11. The powertrain assembly of claim 10 wherein the closing ramp provides a displacement of the intake valve of at least 0.1 millimeters.

12. The powertrain assembly of claim 9 wherein the valve closing portion is engaged with the valve lift mechanism for at least 160 degrees of crankshaft rotation between a beginning of the intake stroke and an end of the compression stroke.

13. The powertrain assembly of claim 12 wherein the peak engages the valve lift mechanism during the intake stroke and the closing ramp engages the valve lift mechanism between 120 degrees and 170 degrees of crankshaft rotation after the peak engages the valve lift mechanism.

14. The powertrain assembly of claim 9 wherein the lobe further includes a valve opening portion defined between a starting point of the lobe on the base circle and the peak of the lobe, the valve opening portion defining an opening ramp beginning at the starting point and an opening flank extending from an end of the opening ramp, the closing ramp having a greater rotational extent than the opening ramp.

15. The powertrain assembly of claim 7, wherein the lobe includes a valve closing profile defined between a peak of the lobe and an ending point of the lobe on the base circle and a valve opening portion defined between a starting point on the lobe and the peak, the valve closing profile defining a closing flank and a closing ramp extending from an end of the closing flank to the ending point, the closing ramp having a radial extent from the base circle at the end of the closing flank that is less than 10 percent of the radial extent of the peak from the base circle and having a first angular extent of at least 10 degrees, a second angular extent of the lobe defined between the peak and the ending point being greater than a third angular extent of the lobe defined between the starting point and the peak.

16. A method comprising:

opening an intake valve in communication with an engine cylinder during an intake stroke of a piston located in the cylinder, the opening including displacing the intake valve to a maximum displacement position via a camshaft lobe member engaged with the intake valve; and maintaining the intake valve open via the camshaft lobe member for at least 160 degrees of rotation of a crankshaft engaged with the piston after the displacing the intake valve to the maximum displacement position, the camshaft lobe member including a base circle and a lobe extending radially outward from the base circle, the lobe including a valve closing profile defined between a peak of the lobe and an ending point of the lobe on the base circle and defining a valve opening portion defined between a starting point on the lobe and the peak, the lobe defining a greater angular extent between the peak and the ending point than between the starting point and the peak.

17. The method of claim 16 further comprising closing the intake valve via the camshaft lobe member at least 80 degrees of rotation of the crankshaft after beginning a compression stroke of the piston immediately subsequent to the intake stroke.

18. The method of claim 17 wherein the maintaining includes displacing the intake valve from a first position where the intake valve is open at least 0.1 millimeters to a closed position by engaging a closing ramp of a valve closing portion of the camshaft lobe member defined between a peak of a lobe extending radially outward from a base circle of the camshaft lobe member and an ending point of the lobe on the base circle, the closing ramp extending from an end of a closing flank of the valve closing portion to the ending point and having a constantly decreasing radial extent from the base circle between the end of the closing flank and the ending point, the closing ramp being engaged with the intake valve for at least 20 degrees of crankshaft rotation.

19. The method of claim 18 wherein the displacing the intake valve from the first position to the closed position includes displacing the intake valve at intake valve velocities no greater than 0.030 millimeters/degree of rotation of the camshaft lobe member and accelerations no greater than $-0.005$ millimeters/degree$^2$.

* * * * *